United States Patent
Ku et al.

(10) Patent No.: US 10,356,248 B2
(45) Date of Patent: Jul. 16, 2019

(54) IP CARRIER PEERING

(71) Applicant: AT&T Intellectual Property I, L.P., Atlanta, GA (US)

(72) Inventors: Bernard S. Ku, Austin, TX (US); Lakshminarashimhan Naidu, Pearland, TX (US); James W. Forsyth, Royal Oak, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/145,997

(22) Filed: Sep. 28, 2018

(65) Prior Publication Data
US 2019/0037080 A1   Jan. 31, 2019

Related U.S. Application Data

(63) Continuation of application No. 15/782,565, filed on Oct. 12, 2017, now Pat. No. 10,116,802, which is a continuation of application No. 14/755,086, filed on Jun. 30, 2015, now Pat. No. 9,807,246.

(51) Int. Cl.
*H04L 29/12* (2006.01)
*H04M 7/00* (2006.01)

(52) U.S. Cl.
CPC ........ *H04M 7/0075* (2013.01); *H04L 61/157* (2013.01); *H04L 61/1511* (2013.01)

(58) Field of Classification Search
CPC ........................... H04L 61/1511; H04L 61/157
See application file for complete search history.

(56) References Cited

U.S. PATENT DOCUMENTS

| | | | |
|---|---|---|---|
| 7,154,901 B2 | 12/2006 | Chava et al. |
| 7,672,267 B2 | 3/2010 | Tsai et al. |
| 7,948,967 B2 | 5/2011 | Ku |
| 8,270,344 B2 | 9/2012 | Ku et al. |
| 8,327,024 B2 | 12/2012 | Pattison et al. |
| 8,391,273 B2 | 3/2013 | Ku |

(Continued)

OTHER PUBLICATIONS

Gilles; The IP Multimedia Subsystem in Next Generation Networks; Rapport technique, ENST Bretagne 7 (2007); 9 pages.

(Continued)

*Primary Examiner* — Ronald B Abelson
(74) *Attorney, Agent, or Firm* — Garlick & Markison; Bruce E. Stuckman; Randy W. LaCasse

(57) ABSTRACT

Aspects of the subject disclosure may include, for example, a method and system to interconnect a first communications carrier to a second communications carrier by receiving a request to connect a communication from a first carrier to a second carrier; filtering the request to identify a specific name authority pointer (NPA-NXX) number from a plurality of specific name authority pointer (NPA-NXX) numbers; when the filter identifies the specific name authority pointer (NPA-NXX) number, modifying a private ENUM (tElephone NUmber Mapping) domain of the request to include an intercarrier ENUM apex based domain; retrieving a routing record using a domain name server (DNS) indicated by the intercarrier ENUM apex based domain; and routing the communication to the second carrier using the routing record. Other embodiments are disclosed.

20 Claims, 9 Drawing Sheets

(56) References Cited

U.S. PATENT DOCUMENTS

| | | |
|---|---|---|
| 8,432,923 B2 | 4/2013 | Ku |
| 8,571,015 B2 | 10/2013 | Ku |
| 8,909,224 B2 | 12/2014 | Haynes et al. |
| 2003/0007482 A1 | 1/2003 | Khello et al. |
| 2004/0215828 A1 | 10/2004 | Li et al. |
| 2007/0121908 A1 | 5/2007 | Benedyk et al. |
| 2007/0258575 A1 | 11/2007 | Douglas et al. |
| 2007/0286379 A1* | 12/2007 | Wiatrowski ............ H04M 3/42 |
| 2008/0137832 A1 | 6/2008 | Heinze et al. |
| 2010/0151866 A1 | 6/2010 | Karpov et al. |
| 2013/0114432 A1 | 5/2013 | Haynes |
| 2013/0301565 A1 | 11/2013 | Xu et al. |
| 2014/0369267 A1 | 12/2014 | Ni et al. |

OTHER PUBLICATIONS

Lin; A Number Portability Integrated IPX to Improve Traffic Routing Efficiency for VoLTE Services; International Journal of Science and Engineering 4.1 (2014); pp. 175-178.

* cited by examiner

IP CARRIER PEERING

CROSS-REFERENCE TO RELATED APPLICATION(S)

The present U.S. Utility patent application claims priority pursuant to 35 U.S.C. § 120 as a continuation of U.S. Utility application Ser. No. 15/782,565, entitled "IP CARRIER PEERING", filed Oct. 12, 2017, which is a continuation of U.S. Utility application Ser. No. 14/755,086, entitled "IP CARRIER PEERING", filed Jun. 30, 2015, now U.S. Pat. No. 9,807,246 on Oct. 31, 2017, both of which are hereby incorporated herein by reference in their entirety and made part of the present U.S. Utility patent application for all purposes.

FIELD OF THE DISCLOSURE

The subject disclosure relates to connecting peer carriers in a telephonic IP based communications network.

BRIEF DESCRIPTION OF THE DRAWINGS

Reference will now be made to the accompanying drawings, which are not necessarily drawn to scale, and wherein.

DETAILED DESCRIPTION

Figure 1:
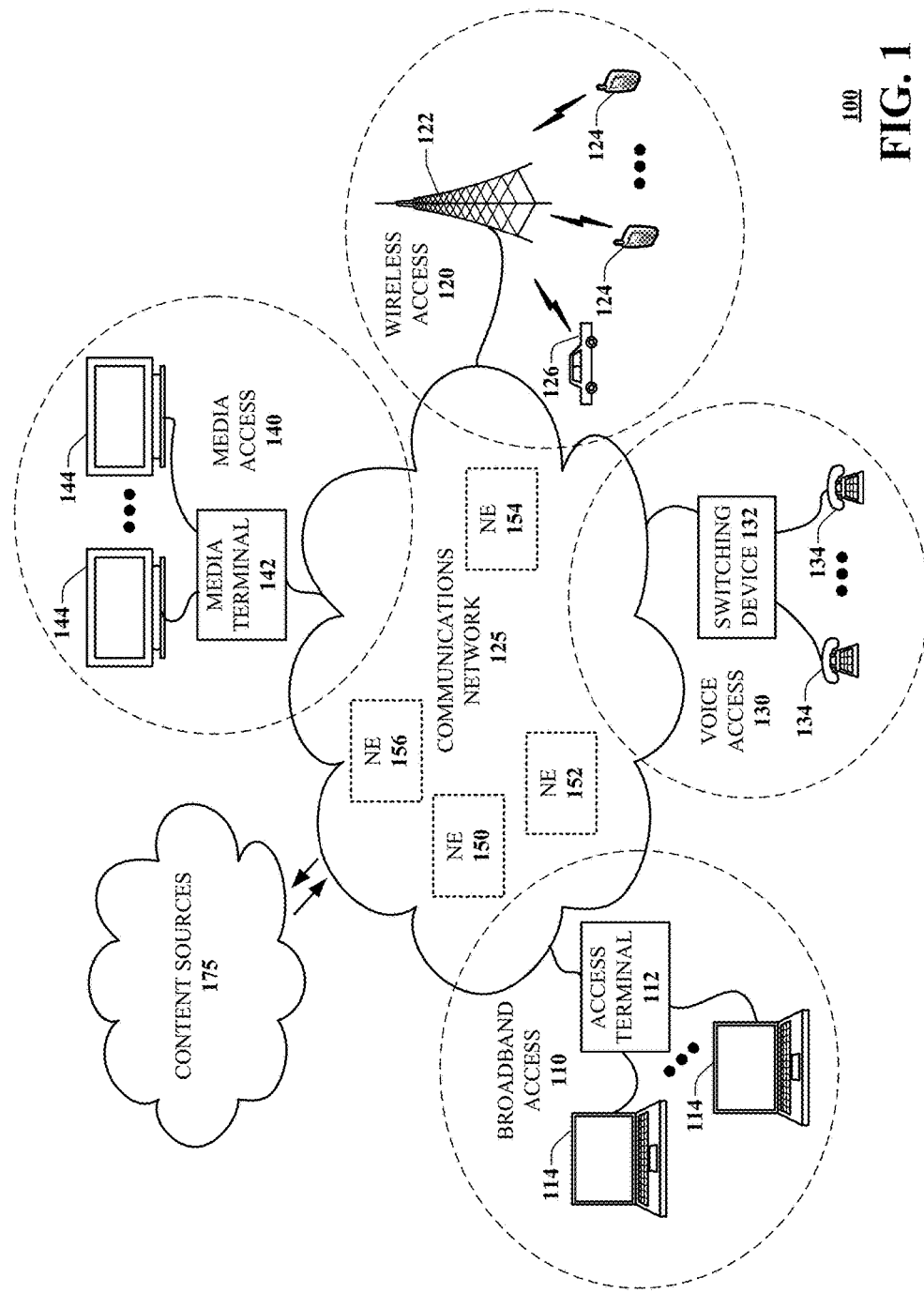
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

Carriers need to peer (connect/coordinate) with other IP carriers to expand their service and area coverage for their rich IP services. Carrier ENUM (tElephone NUmber Mapping) is a critical element in the interconnection of national and global carriers. E.164 generally refers to ordinary telephone numbers. ENUM is a bridge between a switched telephony network and Internet as it translates telephone numbers into Internet addresses. This all happens in the background as a call is being placed. ENUM may contain a reference to a SIP (Session Initiation Protocol) URI, a telephone number to dial, a web page or an e-mail address.

However, problems exist with present carrier architectures. For example, there typically is only one domain configured with the ENUM client, e.g. the IMS core of a carrier. IMS (The IP Multimedia Subsystem) is an architectural framework for delivering IP multimedia services. Historically, mobile phones have provided voice call services over a switched-circuit-style network, rather than strictly over an IP packet-switched network. Alternative methods of delivering voice or other multimedia services over IP have become available on smartphones (e.g. VoIP or Skype), but they have not become standardized across the industry. IMS is an architectural framework to provide such standardization.

For core queries to a carrier's private ENUM for a called E.164 number (intended for a second carrier), the private ENUM of the first or originating carrier will not find the entry. Since the outbound called telephone number is intended for a second carrier partner, the first carrier Private ENUM will not be able to find a match and the call will not be continued in the IP realm.

A methodology is needed that provides Carrier ENUM based routing for a first carrier subscriber to locate and to connect to subscribers of another IP Peering Carrier.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, Ultra-Wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, smartphones, wearable devices, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box (STB), personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
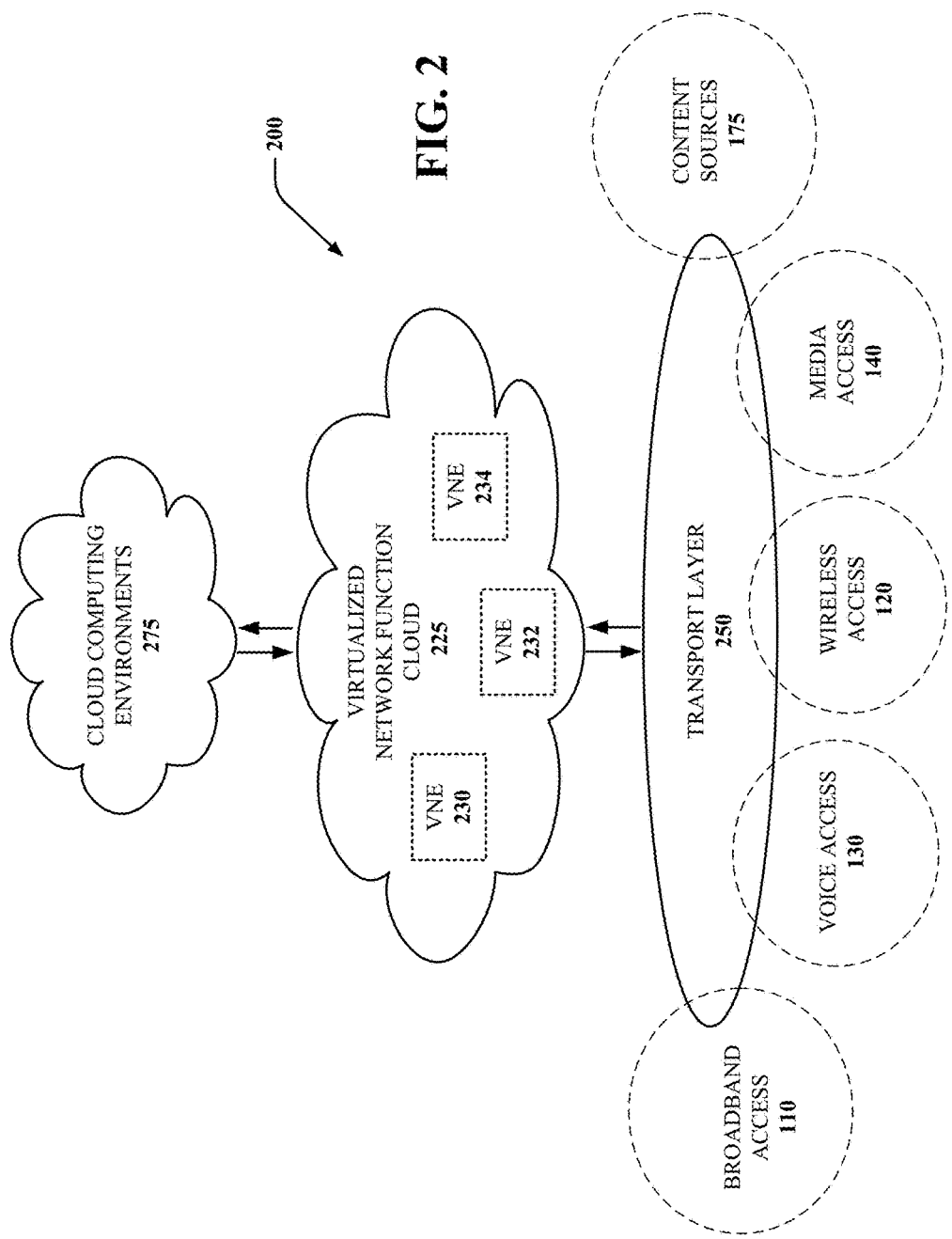
FIG. 2 is a block diagram illustrating an example, non-limiting embodiment of a virtualized communication network in accordance with various aspects described herein.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 to provide the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

Cloud computing environments 275 can interface with the virtualized network function cloud 225 via APIs that expose functional capabilities of the virtual network element (VNE) 230, 232, 234, etc. to provide flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
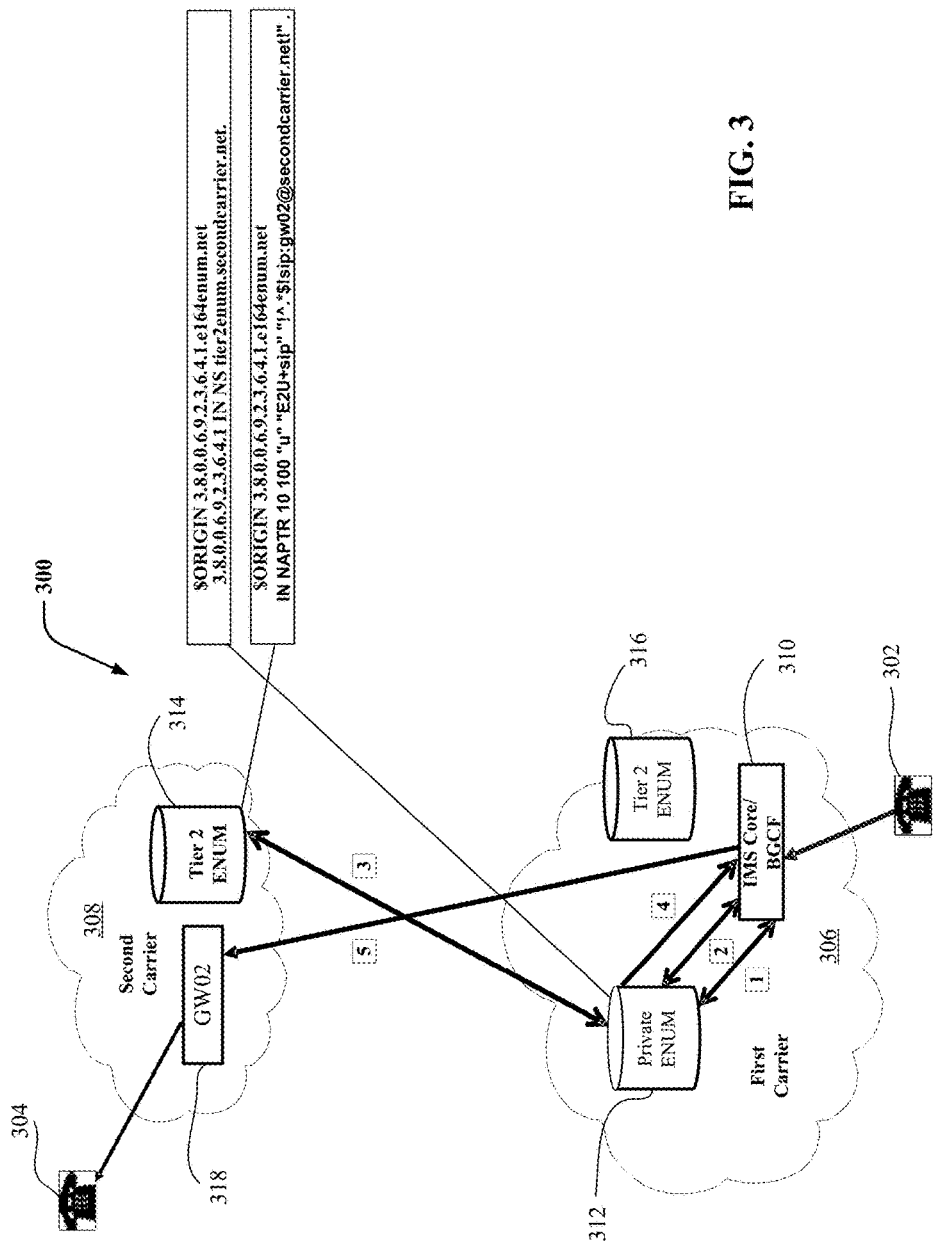
FIG. 3 is a block diagram illustrating an example, non-limiting embodiment of interconnecting carriers in accordance with various aspects described herein.

Turning now to FIG. 3, a block diagram 300 illustrating a non-limiting embodiment of interconnecting carriers in accordance with various aspects described herein is shown. More specifically, an IP based call (e.g., VoLTE (voice over long term evolution)) is placed from a first subscriber of a first carrier to a second subscriber of a second carrier in accordance with various aspects described herein. IP services include any of, but are not limited to: VoLTE, Video Calling, Capability Exchange or RCS (rich communication services) Messaging.

A shown, an IP call from a first subscriber 302 of first carrier 306 intended for a second subscriber 304 of second carrier 308 is received. The call (a request to connect the first subscriber to the second subscriber) is input to IMS core 310. In flow 1, IMS core 310 queries first carrier private ENUM 312 to retrieve a NAPTR (Name Authority Pointer) record for called E.164 number (intended for the second carrier) and does not find a corresponding entry for this record (as it is not in the first carrier's system). A Name Authority Pointer (NAPTR) is a type of resource record in the Domain Name System (DNS) of the Internet. NAPTR records are most commonly used for applications in Internet telephony, for example, in the mapping of servers and user addresses in the Session Initiation Protocol (SIP).

Upon finding no corresponding entry, in flow 2, the query is sent to BGCF (Breakout Gateway Control Function). BGCF, modifies the existing domain as found in the query, for example "e.164.arpa", representing the domain of private ENUM 312 of first carrier 306 is modified to an intercarrier ENUM apex based domain, for example, "e164enum.net". The modified query is then resent, returned in flow 2, to private ENUM 312 where a DNS forwarder (not shown), retrieves an IP address of second carrier 308 Tier 2 ENUM 314. In an alternative embodiment, specific known domains of specific carrier partners can be set as the intercarrier ENUM apex based domain.

Following the receipt of the IP address, in flow 3, the first carrier 306 private ENUM 312 forwards the query to second carrier 308 Tier 2 ENUM 314. Second carrier 308 Tier 2 ENUM 314 retrieves (e.g., looks-up in a table) the corresponding entry (NAPTR), which, in flow 4, is then returned to IMS core 310 with a second gateway (GW02 318) URI where second carrier 308 wants to accept calls from first carrier 306. In flow 5, IMS core 310 forwards call processing to second carrier 308 gateway 318 to complete the IP call to the desired second carrier called party 304. Please note FIG. 3 illustrates an example of carrier 1 (e.g., AT&T) to carrier 2 (e.g., Verizon) process, but is not limited thereto. Any carrier-to-carrier(s) implementation is deemed within the scope of the technology described and illustrated herein.

Figure 4:
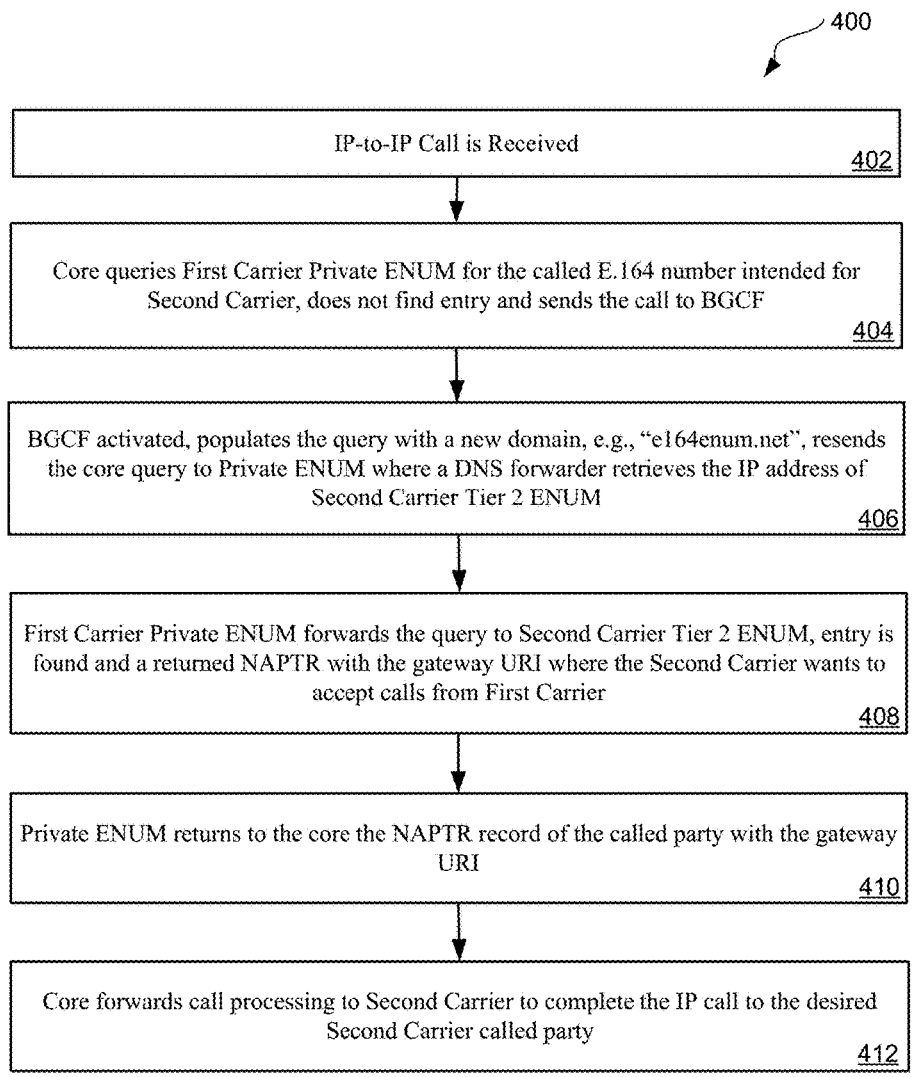
FIG. 4 is a flow diagram illustrating an example, non-limiting embodiment of processing an IP based call from a first subscriber of a first carrier to a second subscriber of a second carrier in accordance with various aspects described herein.

Turning now to FIG. 4, a flow diagram 400 illustrating an example, non-limiting embodiment of processing an IP based call (e.g., VoLTE) from a first subscriber of a first carrier to a second subscriber of a second carrier in accordance with various aspects described herein is shown. In step 402, an IP call from a first subscriber 302 of first carrier 306 intended for a second subscriber 304 of second carrier 308 is received. The call (a request to connect the first subscriber to the second subscriber) is input to IMS core 310. In step 404, IMS core 310 queries first carrier private ENUM 312 to retrieve a NAPTR (Name Authority Pointer) record for called E.164 number intended for the second carrier and does not find a corresponding entry for this record.

Upon finding no corresponding entry, the request is sent to BGCF (Breakout Gateway Control Function) thereby activating the BGCF as per step 406. BGCF, which is part of IMS core 310, populates (modifies) the ENUM domain (e.g., "e164.arpa") within the request with a new domain representing an intercarrier ENUM apex based domain. One example new domain is "e164enum.net". However, any intercarrier ENUM apex based domain agreed to between one or more carriers and/or a standards committee is considered within the scope of the technology described herein. BGCF can also function as the Transit Function (TF), one of the ENUM clients per 3GPP IMS standards. The request, with modified domain, is resent from BGCF/TF to private ENUM 312 where a DNS forwarder retrieves an IP address of second carrier 308 Tier 2 ENUM 314.

In step 408, the first carrier 306 private ENUM 312 forwards the query to second carrier 308 Tier 2 ENUM 314 based on the retrieved IP address. Second carrier 308 Tier 2 ENUM 314 retrieves (looks-up in a table) the corresponding entry (NAPTR), which, in step 410, is then returned with the gateway URI where second carrier 308 wants to accept calls from first carrier 306. In step 412, IMS core 310 forwards call processing to second carrier 308 to complete the IP call to the desired second carrier called party 304.

Figure 5A:
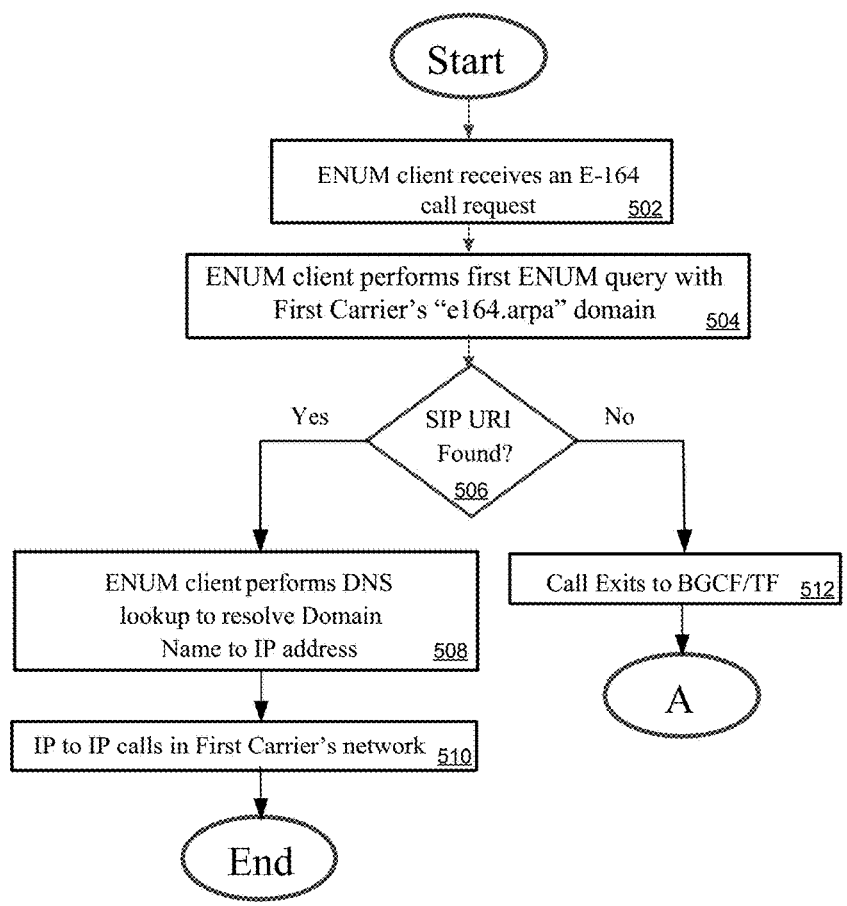
FIGS. 5A and 5B, collectively, illustrate an example, non-limiting embodiment of a method of processing an IP based call from a first subscriber of a first carrier to a second subscriber of the first carrier or to a second subscriber of a second carrier.
Figure 5B:
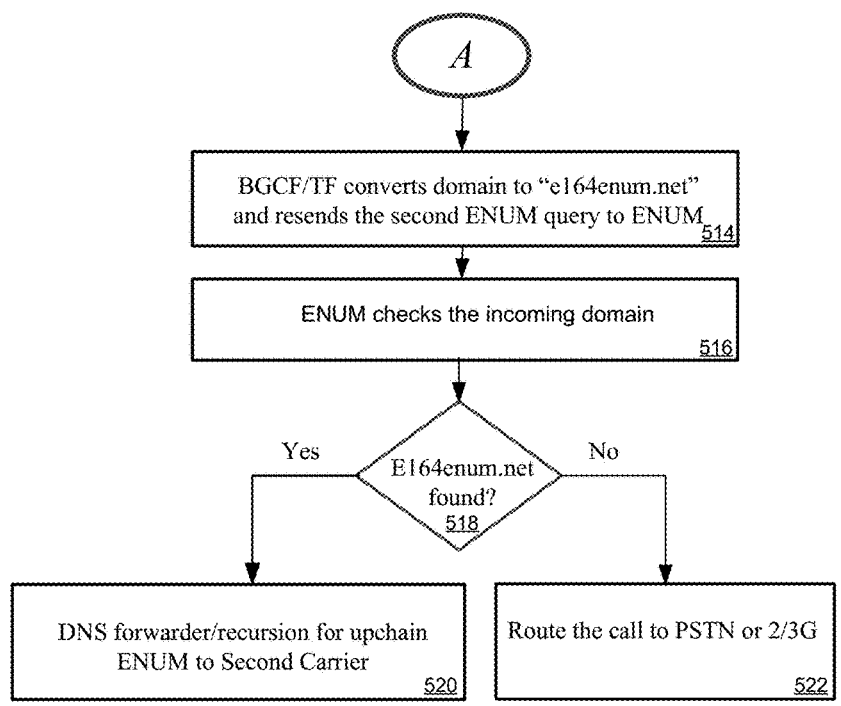

Turning now to FIG. 5A, illustrates a flow diagram of an example, non-limiting embodiment of processing an IP based call (e.g., VoLTE (voice over long term evolution)) from a first subscriber of a first carrier to a second subscriber of the first carrier or to a second subscriber of a second carrier (A —FIG. 5B). In step 502, an IP call from a first subscriber 302 of first carrier 306, intended for either a second subscriber 304 of first carrier 306 or a second subscriber of a second carrier 308, is received. The call (a request to connect the first subscriber to the second subscriber) is received by an ENUM client (e.g., first carrier 306) and includes an e-164 request. In step 504, the ENUM client performs a first ENUM query with domain "e164.arpa". In step 506, it is determined whether an SIP URI (Session Initiation Protocol Uniform Resource Identifier) is stored within server memory of the ENUM client. If an SIP URI is retrieved (Yes), it indicates that the second user is also a subscriber to the first network. Therefore, in step 508, the ENUM client performs DNS look-up to resolve a domain name to IP address and completes the call (IP-to-IP) in step 510. However, if an SIP URI is not retrieved (No), it indicates that the second user is not a subscriber to the first network. In this scenario, the ENUM client is unable to resolve an IP address to complete the call. Therefore, the call process exits to BGCF/TF (Transit Function) in step 512 as further described in association with continued flow A in FIG. 5B.

Turning now to FIG. 5B, illustrates a continuation of flow diagram 500 of an example, non-limiting embodiment of processing an IP based call (e.g., VoLTE (voice over long term evolution)) from a first subscriber of a first carrier to a second subscriber of a second carrier. As previously discussed, upon finding no corresponding SIP URI entry, the request is sent to BGCF/TF. In step 514, the BGCF/TF converts the ENUM domain (e.g., "e164.arpa") of the request to a new domain representing an intercarrier ENUM apex based domain. One example new domain is "e164enum.net". However, as previously described, any intercarrier ENUM apex based domain agreed to between one or more carriers and/or a standards committee is considered within the scope of the technology described herein. The request, with modified domain, is resent as a second ENUM query to the ENUM. In step 516, the ENUM checks the new incoming domain to determine a second carrier to forward the query to. If, in step 518, the domain "e164enum.net" is located for this request (Yes), in step 520, a DNS forwarder/recursion performs an upchain (to a higher tier) ENUM to another carrier partner (e.g., second carrier) to locate the SIP URI within the other carrier ENUM (Tier 1 or Tier 2). If the domain "e164enum.net" is not located, in step 518, for this request (No), in step 522, it is assumed that this is not an IP based call and the call is routed to PSTN (public switched telephone network) or ⅔G communication systems for completion.

Alternate embodiments include setting a number range (NPA-NXX) within a specified zone in e164.apra for intercarrier trail setting. The ENUM response will contain a pointer record to Tier 1 or Tier 2 to retrieve the actual carrier NAPTR record.

Another alternative embodiment includes supporting multiple ENUM domains simultaneously. In this embodiment, the core can set a filter for certain NPA-NXX numbers, which if matched, will append the new domain "e164enum.net" and use the same DNS forwarder, upchaining methods as previously described.

Yet another alternative embodiment includes forwarding all partner carrier calls plus PSTN and ⅔G calls to the partner carrier tier 2 ENUM. The PSTN and ⅔G calls are cached with a TTL (Time To Live) value of, for example, one day, to minimize additional call flows to the carrier partner.

An additional embodiment is to create the DNS forwarded zone which includes placing entries in a named.conf of a first carrier (e.g., AT&T) ENUM BIND DNS server which will automatically forward any e164enum.net queries to a specific partner carrier (e.g., Verizon) or a specific upchained (higher tier) ENUM. Place the following entries in the named.conf of AT&T ENUM BIND server. The end result is that <any TN>.e164enum.net will be passed over to the Second Carrier Tier T2 ENUM.

```
zone "e164enum.net" in {
type forward;
forwarders {
    10.10.10.1; (Primary IP address 1 of Second Carrier
    Tier 2 ENUM)
    10.10.10.2; (Secondary IP address 2 of Second Carrier
    Tier 2 ENUM)
    };
};
```

Which produces the following modified ENUM call flows:
1. ENUM Client ? 1.1.1.1.2.2.2.2.1.5.1.e164enum.net→ATT ENUM
2. ATT ENUM→forward/recursion to 10.10.10.1 ? ←ATT ENUM acts as a proxy agent for the ENUM Client
3. ATT ENUM ? 1.1.1.1.2.2.2.2.1.5.1.e164enum.net→10.10.10.1
4. 10.10.10.1 REPLY 1.1.1.1.2.2.2.2.1.5.1.e164enum.net IN NAPTR . . . ←ATT ENUM
5. ATT ENUM REPLY 1.1.1.1.2.2.2.2.1.5.1.e164enum.net IN NAPTR←ENUM Client Another embodiment is to create a DNS recursion zone. For example, in db.net in a first carrier's ENUM, the following entries are added: e164enum.net IN NS ns-thirdparty.net; ns-thirdparty.net IN A 10.10.10.1; and ns-thirdparty.net IN AAAA 2001:1890:FC:12E6::1:2.

The various embodiments described herein provide a dynamic mechanism for providing carrier ENUM based routing from one carrier to another IP peering partner. It also enhances a carrier's position to offer competitive national or global IP services. It can eliminate retries and delays, when network disruptions or congestions occur. In addition, it provides for optimized service offerings, especially since availability is important in convergent and/or multimedia services. And finally, it improves the efficiency of communication and enhances the flexibility of the IMS to reduce traffic delays and call flows.

Figure 6:
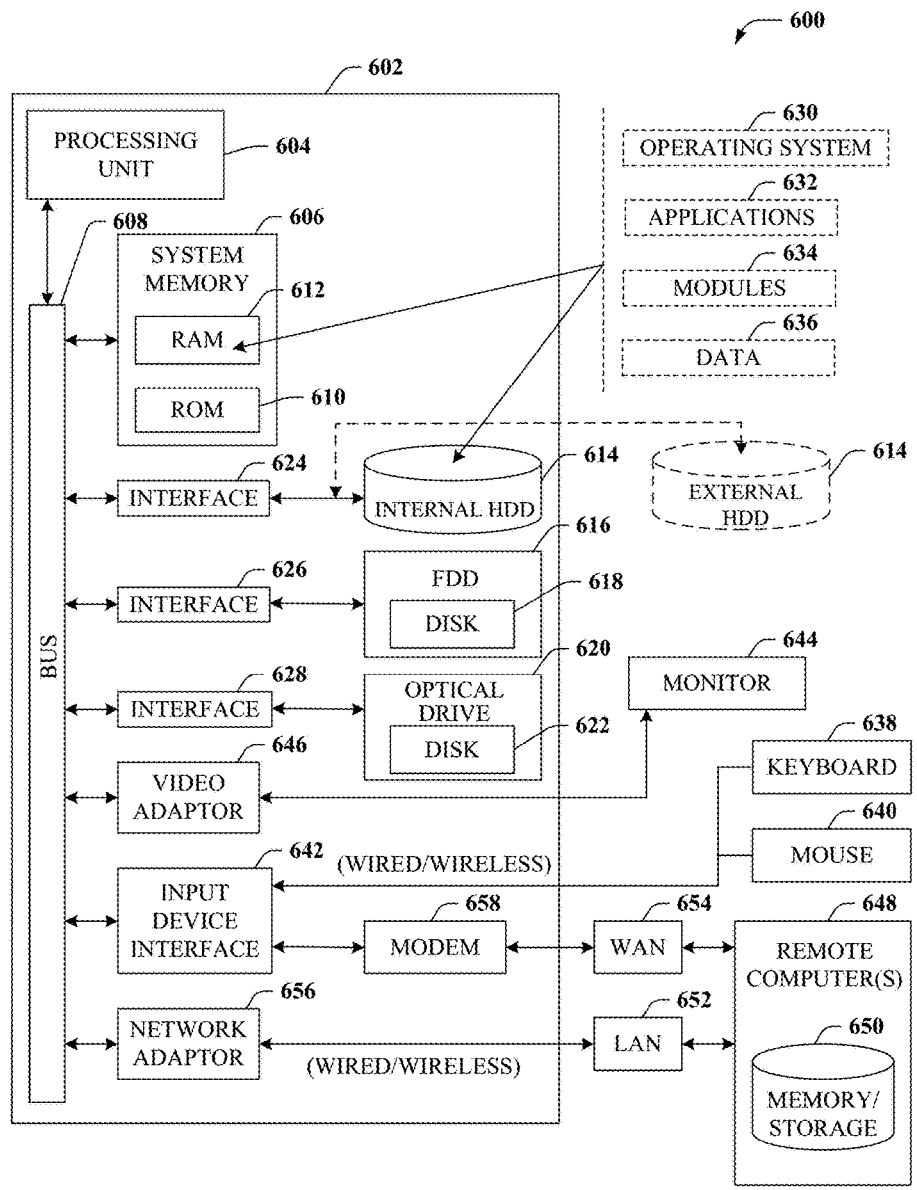
FIG. 6 is a block diagram of an example, non-limiting computing environment in accordance with various aspects described herein.

Turning now to FIG. 6, there is illustrated a block diagram of a computing environment in accordance with various aspects described herein. In order to provide additional context for various embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, virtual network elements 230, 232, 234, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that any functions and features described herein in association with the operation of a processor could likewise be performed by a processing circuit.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprise any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structures that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal hard disk drive 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The internal hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems. Examples of application programs 632 that can be implemented and otherwise executed by processing unit 604 include diversity selection determining.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to system bus 608, but can be connected by other interfaces, such as a parallel port, an IEEE 1394 serial port, a game port, a universal serial bus (USB) port, an IR interface, etc.

A monitor 644 or other type of display device can be also connected to system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
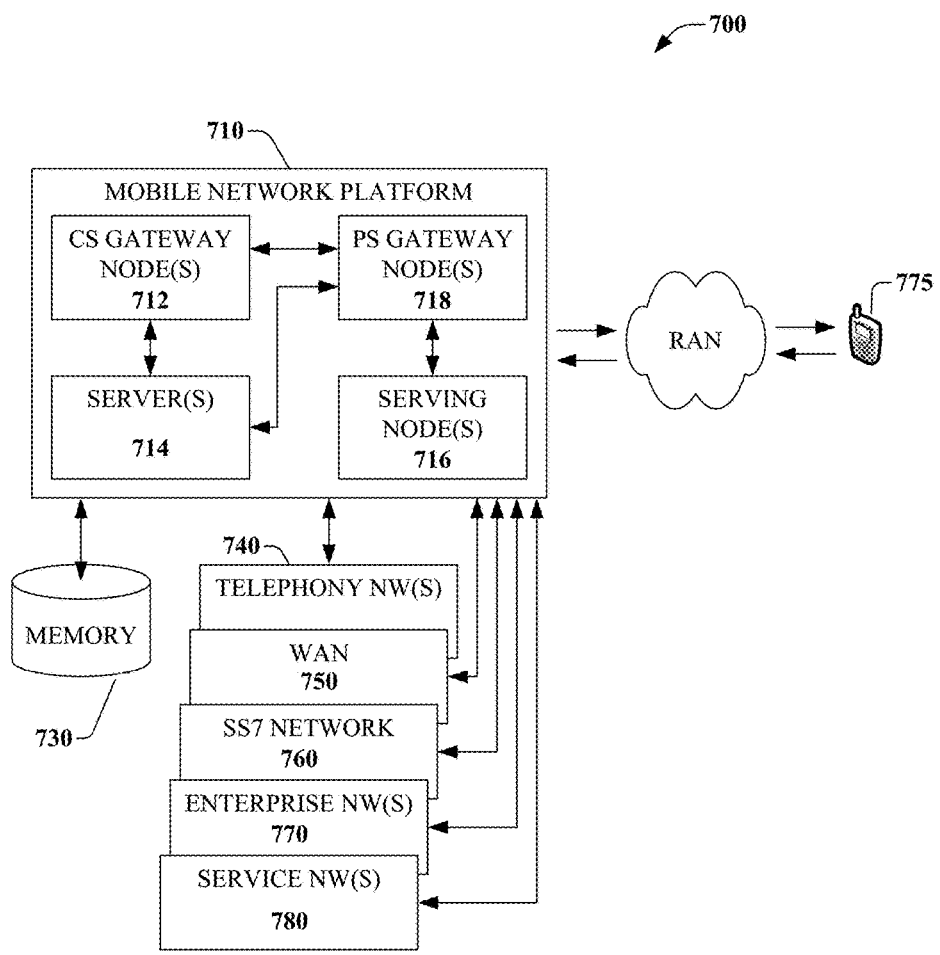
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or virtual network elements 230, 232, 234, etc. In one or more embodiments, the mobile network platform 710 can generate and receive signals transmitted and received by base stations or access points such as base station or access point 122. Generally, wireless network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunications. As a non-limiting example, wireless network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. Circuit switched gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication.

In addition to receiving and processing CS-switched traffic and signaling, PS gateway node(s) 718 can authorize and authenticate PS-based data sessions with served mobile devices 775. Data sessions can comprise traffic, or content(s), exchanged with networks external to the wireless network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in server(s) 714, packet-switched gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, wireless (mobile) network platform 710 also comprises serving node(s) 716 that, based upon available radio technology layer(s) within technology resource(s), convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in wireless network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a provisioning server, an operations and maintenance server, a security server that can implement at least in part a certificate authority and firewalls as well as other security mechanisms, and the like. In an aspect, security server(s) secure communication served through wireless network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to wireless network platform 710 (e.g., deployed and operated by the same service provider), such as the distributed antennas networks shown in FIG. 1(*s*) that enhance wireless service coverage by providing more network coverage.

It is to be noted that server(s) 714 can comprise one or more processors configured to confer at least in part the functionality of mobile network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of wireless network platform 710. Other operational information can comprise provisioning information of mobile devices served through wireless platform network 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, enterprise network(s) 770, or SS7 network 760. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
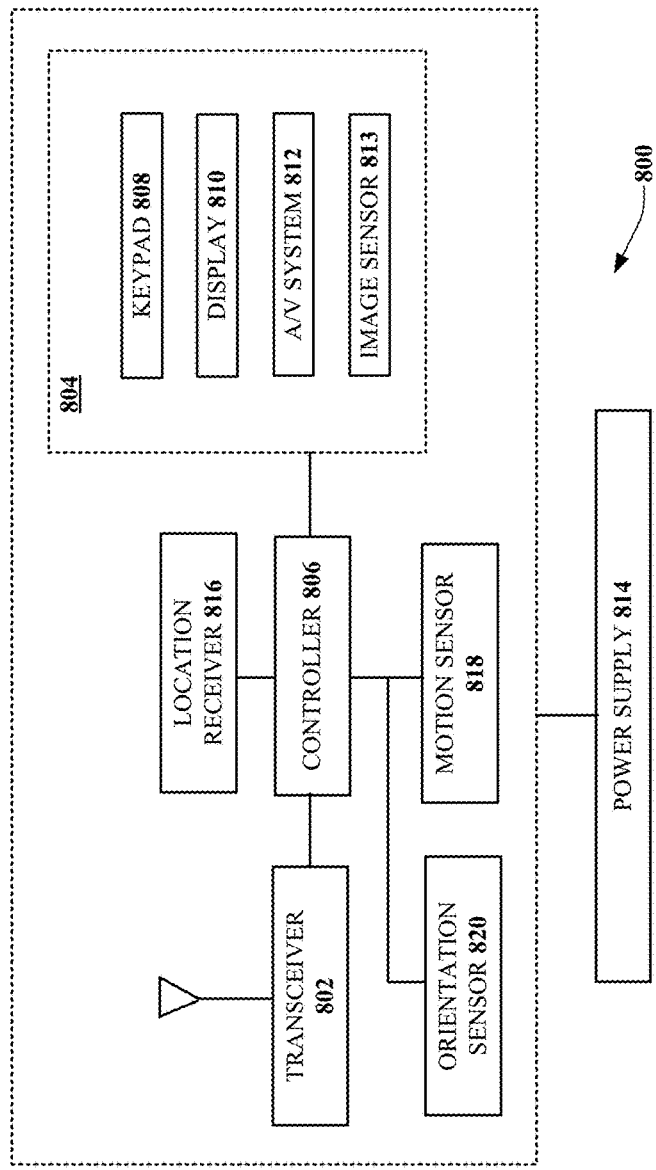
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144 or other client devices for communication via either communications network 125.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Any terms "first," "second," "third," and so forth, as used in the claims, unless otherwise clear by context, are for clarity only and do not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in an optional training controller evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer", "viewer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system to interconnect carrier communication systems, the system comprises:
a communication client, the communication client configured to:
receive a request, including an e.164 number, to connect an IP (Internet protocol) call from a first carrier to a second carrier;
filter the request to identify a specific name authority pointer (NPA-NXX) number;
when the filtering identifies the specific name authority pointer (NPA-NXX) number, modify a query to a private ENUM (tElephone NUmber Mapping) to include an intercarrier ENUM apex based domain;
forward the modified query to the second carrier to retrieve a routing record from the second carrier, wherein the forward the modified query includes an upchain to a tier 1 ENUM or tier 2 ENUM of the second carrier; and
route the IP call to the second carrier using the routing record.

2. The system of claim 1, wherein the filtering further identifies at least one additional specific name authority pointer (NPA-NXX) number.

3. The system of claim 2, wherein the specific name authority pointer (NPA-NXX) number is selected from a group of two or more specific name authority pointer (NPA-NXX) numbers representing two or more domains, respectively.

4. The system of claim 1, wherein the request includes IP services comprising any of: VoLTE (voice over long term evolution), Video Calling, Capability Exchange or RCS (rich communication services) Messaging.

5. The system of claim 1, wherein the communication client includes an IMS (IP Multimedia Subsystem) infrastructure.

6. The system of claim 1 further comprising an BGCF (Breakout Gateway Control Function) to perform the modification of the query and forwarding of the modified query.

7. The system of claim 1 wherein the forward the modified query is performed by a DNS (Domain Name Server) forwarder.

8. The system of claim 1 further comprising an BGCF (Breakout Gateway Control Function) to perform the modification of the query and to perform as Transit Function (TF) forwarding of the modified query to a plurality of carriers until locating a carrier ENUM with the routing record.

9. The system of claim 1, wherein the intercarrier ENUM apex based domain includes one of: a specific second carrier private ENUM domain or an intercarrier domain.

10. The system of claim 1, wherein the intercarrier ENUM apex based domain comprises e164enum.net.

11. A method to interconnect a first communications carrier to a second communications carrier, the method comprising:
receiving a request, including an e.164 number, to connect an IP (Internet protocol) call from a first carrier to a second carrier;
filtering the request to identify a specific name authority pointer (NPA-NXX) number;
when the filtering identifies the specific name authority pointer (NPA-NXX) number, modifying a query to a private ENUM (tElephone NUmber Mapping) to include an intercarrier ENUM apex based domain;
forwarding the modified query to the second carrier to retrieve a routing record from the second carrier, wherein the forwarding of the modified query includes an upchain to a tier 1 ENUM or tier 2 ENUM of the second carrier; and
routing the IP call to the second carrier using the routing record.

12. The method of claim 11, wherein the filtering further identifies at least one additional specific name authority pointer (NPA-NXX) number.

13. The method of claim 12, wherein the specific name authority pointer (NPA-NXX) number is selected from a group of two or more specific name authority pointer (NPA-NXX) numbers representing two or more domains, respectively.

14. The method of claim 11, wherein the request includes IP services comprising any of: VoLTE (voice over long term evolution), Video Calling, Capability Exchange or RCS (rich communication services) Messaging.

15. The method of claim 11, wherein the intercarrier ENUM apex based domain comprises e164enum.net.

16. The method of claim 11, wherein the intercarrier ENUM apex based domain includes one of: a specific second carrier private ENUM domain or an intercarrier domain.

17. A method to interconnect a first communications carrier to a second communications carrier, the method comprising:
 receiving a request, including an e.164 number, to connect an IP (Internet protocol) call from a first carrier to a second carrier;
 filtering the request to identify a specific name authority pointer (NPA-NXX) number from a plurality of specific name authority pointer (NPA-NXX) numbers;
 when the filtering identifies the specific name authority pointer (NPA-NXX) number, modifying a query to a private ENUM (tElephone NUmber Mapping) to include an intercarrier ENUM apex based domain;
 forwarding the modified query to the second carrier to retrieve a routing record from the second carrier, wherein the forwarding of the modified query includes an upchain to a tier 1 ENUM or tier 2 ENUM of the second carrier; and
 routing the IP call to the second carrier using the routing record.

18. The method of claim 17, wherein the request includes IP services comprising any of: VoLTE (voice over long term evolution), Video Calling, Capability Exchange or RCS (rich communication services) Messaging.

19. The method of claim 17, wherein the intercarrier ENUM apex based domain includes one of: a specific second carrier private ENUM domain or an intercarrier domain.

20. The method of claim 17, wherein the intercarrier ENUM apex based domain comprises e164enum.net.

* * * * *